(12) United States Patent
Fink et al.

(10) Patent No.: US 8,474,787 B2
(45) Date of Patent: Jul. 2, 2013

(54) VALVE CARTRIDGE FOR A SOLENOID VALVE, AND ASSOCIATED SOLENOID VALVE

(75) Inventors: Reinhard Fink, Bietigheim-Bissingen (DE); Joerg Fricke-Schmidt, Charleston, SC (US); Hans-Peter Bartosch, Oberstdorf (DE)

(73) Assignee: Robert Bosch GmbH, Stuttgart, DE (US)

( * ) Notice: Subject to any disclaimer, the term of this patent is extended or adjusted under 35 U.S.C. 154(b) by 271 days.

(21) Appl. No.: 12/797,005

(22) Filed: Jun. 9, 2010

(65) Prior Publication Data
US 2010/0308245 A1 Dec. 9, 2010

(30) Foreign Application Priority Data
Jun. 9, 2009 (DE) .......................... 10 2009 026 853

(51) Int. Cl.
*F16K 31/02* (2006.01)

(52) U.S. Cl.
USPC .................. 251/129.02; 251/129.15; 251/362; 137/601.14; 137/601.2; 137/550; 303/119.2; 303/119.3

(58) Field of Classification Search
USPC ... 251/129.02, 129.15, 360–362; 137/601.14, 137/601.2, 544, 550; 303/119.2, 119.3
See application file for complete search history.

(56) References Cited

U.S. PATENT DOCUMENTS

| | | | | |
|---|---|---|---|---|
| 4,298,020 A * | 11/1981 | Inada et al. | ............... | 137/315.05 |
| 5,836,350 A * | 11/1998 | Sakaguchi et al. | ............. | 137/550 |
| 6,189,985 B1 * | 2/2001 | Fritsch et al. | .............. | 303/119.2 |
| 6,254,199 B1 * | 7/2001 | Megerle et al. | ............. | 303/119.2 |
| 6,439,265 B1 * | 8/2002 | Gruschwitz et al. | ..... | 137/601.14 |
| 7,243,899 B2 * | 7/2007 | Acar et al. | ................ | 251/129.07 |
| 7,871,056 B2 * | 1/2011 | Kratzer | ..................... | 251/129.02 |
| 8,006,951 B2 * | 8/2011 | Guggenmos et al. | .... | 251/129.02 |
| 8,123,193 B2 * | 2/2012 | Kratzer | ..................... | 251/129.18 |
| 2008/0197308 A1 * | 8/2008 | Guggenmos et al. | .... | 251/129.02 |
| 2010/0051839 A1 * | 3/2010 | Guggenmos et al. | .... | 251/129.02 |
| 2010/0200790 A1 * | 8/2010 | Kratzer | ..................... | 251/129.15 |
| 2010/0264341 A1 * | 10/2010 | Kratzer | ..................... | 251/129.15 |
| 2010/0264342 A1 * | 10/2010 | Heyer et al. | .............. | 251/129.15 |
| 2011/0198522 A1 * | 8/2011 | Ambrosi et al. | ......... | 251/129.15 |

\* cited by examiner

*Primary Examiner* — Eric Keasel
*Assistant Examiner* — Minh Le
(74) *Attorney, Agent, or Firm* — Maginot, Moore & Beck

(57) ABSTRACT

The invention relates to a valve cartridge for a solenoid valve, having a capsule, a valve insert that is inserted by a first end into the capsule and on its other end receives a valve body with a main valve seat. A lower valve part is axially braced on the valve insert, and a flat filter for filtering out dirt particles is connected via a retaining element to the lower valve part. According to the invention, the retaining element includes at least one component on the flat filter side and at least one corresponding component on the lower valve part side, which makes at least one partial clamping connection between the flat filter and the lower valve part. The invention further relates to a solenoid valve having such a valve cartridge.

20 Claims, 8 Drawing Sheets

20.7

21.1
20
21
21.1

VALVE CARTRIDGE FOR A SOLENOID VALVE, AND ASSOCIATED SOLENOID VALVE

CROSS-REFERENCE TO RELATED APPLICATION

This application is based on German Patent Application 10 2009 026 853.7 filed Jun. 9, 2009.

BACKGROUND OF THE INVENTION

1. Field of the Invention

The invention relates to a valve cartridge for a solenoid valve and to an associated solenoid valve.

2. Description of the Prior Art

A conventional solenoid valve, in particular for a hydraulic assembly, which is used for instance in an anti-lock brake system (ABS) or traction control system (TCS) or an electronic stability program system (ESP system), is shown in FIGS. 1 through 5. As can be seen from FIGS. 1 through 5, the conventional solenoid valve 1, which is embodied for instance as a regulating valve that is open when without current, includes a magnet assembly 5 for generating a magnetic flux, which magnet assembly in turn includes a housing jacket 5.1, a winding holder 5.2, a coil winding 5.3, and a cover disk 5.4, and the solenoid valve further includes a valve cartridge 2, which in turn includes a capsule 2.1, a valve insert 8 inserted by a first end into the capsule 2.1, a magnet armature 4 with a tappet 6, and a restoring spring 7. In the production of the conventional solenoid valve 1, the capsule 2.1 and the valve insert 8 of the valve cartridge 2 are joined together by pressing, and the valve cartridge 2 is sealed off hydraulically from the atmosphere by a sealing weld 2.2. In addition, the valve insert 8 absorbs the compressive forces occurring in the hydraulic system and conducts them onward via a calked flange 8.1 to a calked region 41 of a fluid block 40.

By means of current supplied to the coil winding 5.3 via electrical terminals 5.5, the magnet assembly 5 generates a magnetic force that moves the longitudinally movable magnet armature 4, along with the tappet 6 that includes a flat filter 6.1 with a main sealing element 6.2, toward the valve insert 8 counter to the force of the restoring spring 7, and the tappet 6 and restoring spring 7 are guided in an inner bore in the valve insert 8. The valve insert 8 conducts the magnetic flux, introduced by the magnet assembly 5 via the cover disk 5.4, axially in the direction of the magnet armature 4 via an air gap 5.6. Moreover, on a second end, the valve insert 8 receives the so-called valve body 9, which includes a main valve seat 9.1 into which the main sealing element 6.2, embodied as a sealing dome plunges sealingly, in order to perform the function of sealing the solenoid valve 1.

As can also be seen from FIGS. 1 through 5, a lower valve part 10 is placed axially against the valve insert 8 and braced; it includes a check valve 10.1, disposed eccentrically to the main valve axis and having a check valve seat 10.2, and a check valve closing element 10.3. The lower valve part 10, embodied for instance as a plastic insert, additionally serves to seal off from the surrounding fluid block 40, for sealing off from the valve body 9, and for receiving a flat filter 11 with an inserted screen and a recess 11.2 for the check valve 10.1. Moreover, in the solenoid valve 1 shown, an entirely injection-molded ring filter 3 with a support element 3.1 and a filter element 3.2 for filtering out dirt particles is constructed/installed in such a way that associated sealing points 3.3, 3.4 are disposed directly between the ring filter 3 and the solenoid valve 1, in order to avoid bypasses. Via an upper sealing point 3.3, the ring filter 3 seals off axially from the valve insert 8, and via a lower sealing point 3.4, it seals off radially relative to the adjoining component, in this case the lower valve part 10. The plastic flat filter 11 is connected to the adjoining lower valve part 10, in order to ensure the installation and handling of the complete solenoid valve 1 in production. In the solenoid valve construction shown, an annular rib 11.1 of the flat filter 11 plunges into an encompassing annular groove 10.6 of the lower valve part 10. The annular rib 11.1 is partially pressed in the annular groove 10.6 radially to make a captive fastening. These partial press-fittings 10.5 are located in the vicinity of a sealing lip 10.4 of the lower valve part 10. The sealing lip 10.4 has the function of a hydraulic seal in the fluid block 40. By means of the partial press-fittings 10.5 with the flat filter 11, asymmetrical introductions of force into the sealing lip 10.4 can occur, as a result of which the sealing function relative to the fluid block 40 can be impaired. An axial contact area for the flat filter 11 is ensured in the lower valve part 10 by means of a superelevated contour in the form of a C-rib 10.7. In the vicinity of the C-rib 10.7, major accumulations of material occur, and thus major differences in wall thickness in the lower valve part 10. This can lead to flaws (bubbles) and thus to problems of strength in the component. Moreover, the structural height of the solenoid valve and the construction of the lower valve part are affected by this type of connection.

ADVANTAGES AND SUMMARY OF THE INVENTION

The valve cartridge according to the invention for a solenoid valve, has the advantage over the prior art that retaining means for connecting a flat filter, for filtering out dirt particles, to the lower valve part include at least one component on the flat filter side and at least one corresponding component on the lower valve part side, which make at least a partial clamping connection between the flat filter and the lower valve part. Because a conventional C-rib and/or an annular groove depth in the lower valve part is omitted or reduced and an annular rib in the flat filter is omitted, attaching the flat filter to the lower valve part in accordance with the invention advantageously reduces the axial space in the lower region of the solenoid valve. A retaining element of the invention moreover prevent force from being introduced asymmetrically or at a single point in the vicinity of a sealing lip of the lower valve part, thereby improving the sealing function of the lower valve part relative to a fluid block with the built-in solenoid valve.

The substantial advantage of the valve cartridge of the invention is that because of the redesign of the lower valve part in a way that optimizes space, it is possible to achieve a cost-saving solenoid valve using sleeve technology. Such solenoid valves, by design, have greater axial tolerances in the lower region of the solenoid valve, and these can be constructively compensated for by the retaining element of the invention. Moreover, differences in wall thickness in the lower valve part or accumulations of material can be reduced by the retaining element of the invention. This leads on the one hand to minimized vibration in the component during the production process, which is advantageous particularly for the sealing function in the check valve, and on the other hand, strength-reducing flaws (bubbles) in the component can be minimized; production-dictated shrinkage can occur in plastic injection-molded components.

A solenoid valve of the invention includes a magnet assembly and a valve cartridge of the invention, having a capsule, a valve insert that is inserted by a first end into the capsule and that on the other end receives a valve body with a main valve seat, and a lower valve part that is braced axially on the valve insert, and inside the valve cartridge, a magnet armature is guided movably that is movable by a magnetic force generated by the magnet assembly and moves a tappet, guided inside the valve insert, that has a closing element with a sealing element; for performing the sealing function, the sealing element plunges sealingly into the main valve seat of the valve body. In principle, embodiments of the invention can be used for all solenoid valves, whether open when without current or closed when without current.

It is especially advantageous that the at least one component on the flat filter side is embodied as a retaining tab, and the at least one component on the lower valve part side is embodied as a groove segment. Each component, embodied as a retaining tab, on the flat filter side plunges into a respective component, embodied as a groove segment, on the lower valve part side. Moreover, at least one clamping rib can be integrally formed onto the at least one component on the flat filter side embodied as a retaining tab, and the clamping rib is radially over-pressed in the corresponding component on the lower valve part side embodied as a groove segment. Thus for instance two clamping ribs on the outside can be integrally formed onto the at least one component on the flat filter side embodied as a retaining tab. In addition, a further clamping rib, on the inside, can be integrally formed onto the at least one component on the flat filter side embodied as a retaining tab. By means of the clamping ribs, the clamping connection between the flat filter and the lower valve part can advantageously be improved. Moreover, the dispositions of the retaining tabs on the flat filter and of the corresponding groove segments on the lower valve part can be utilized for the sake of correctly orienting the flat filter in the lower valve part.

In a feature of the valve cartridge of the invention, the lower valve part has an encompassing sealing lip, which has an encompassing spacing, which remains constant, from the clamped flat filter. Because of the encompassing spacing that remains constant, an asymmetrical deformation of the sealing lip of the lower valve part, and thus sacrifices in terms of the sealing function relative to the fluid block, can advantageously be avoided.

In a further feature of the valve cartridge of the invention, the lower valve part is embodied as a plastic injection-molded part, with a wall thickness that remains essentially constant. Because of the constant wall thickness in the lower valve part, flaws (bubbles) in the plastic component made by injection molding can be avoided, and cycle times in the production of the lower valve part, that is, cycle times for an injection molding operation in the injection mold for the lower valve part, are optimized.

In a further feature of the valve cartridge of the invention, the valve insert is embodied as a one-piece slit sleeve, and the valve body is embodied as a hoodlike sleeve, which is pressed into a second end of the valve insert, embodied as a slit sleeve, in such a manner that the main valve seat is disposed inside the valve insert. As a result, the valve insert and the valve body can advantageously be produced by economical methods, and the performance of the valve cartridge remains constant. For instance, the valve insert embodied as a one-piece slit sleeve can be produced by curling a sheet-metal strip, and the valve body can for instance be produced as a hoodlike deep-drawn part.

In a further feature of the valve cartridge of the invention, the capsule is embodied as a valve component that seals off from the atmosphere and is calked to the fluid block via a calked bush in a calked region. As a result, the capsule also takes on the sealing function, from the time that the valve cartridge is calked in the fluid block. Since the capsule also takes on the function of sealing off the valve insert from the outside, assembling the valve can advantageously be simplified, so that there is no longer the need for a sealing weld between the capsule and the valve insert.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
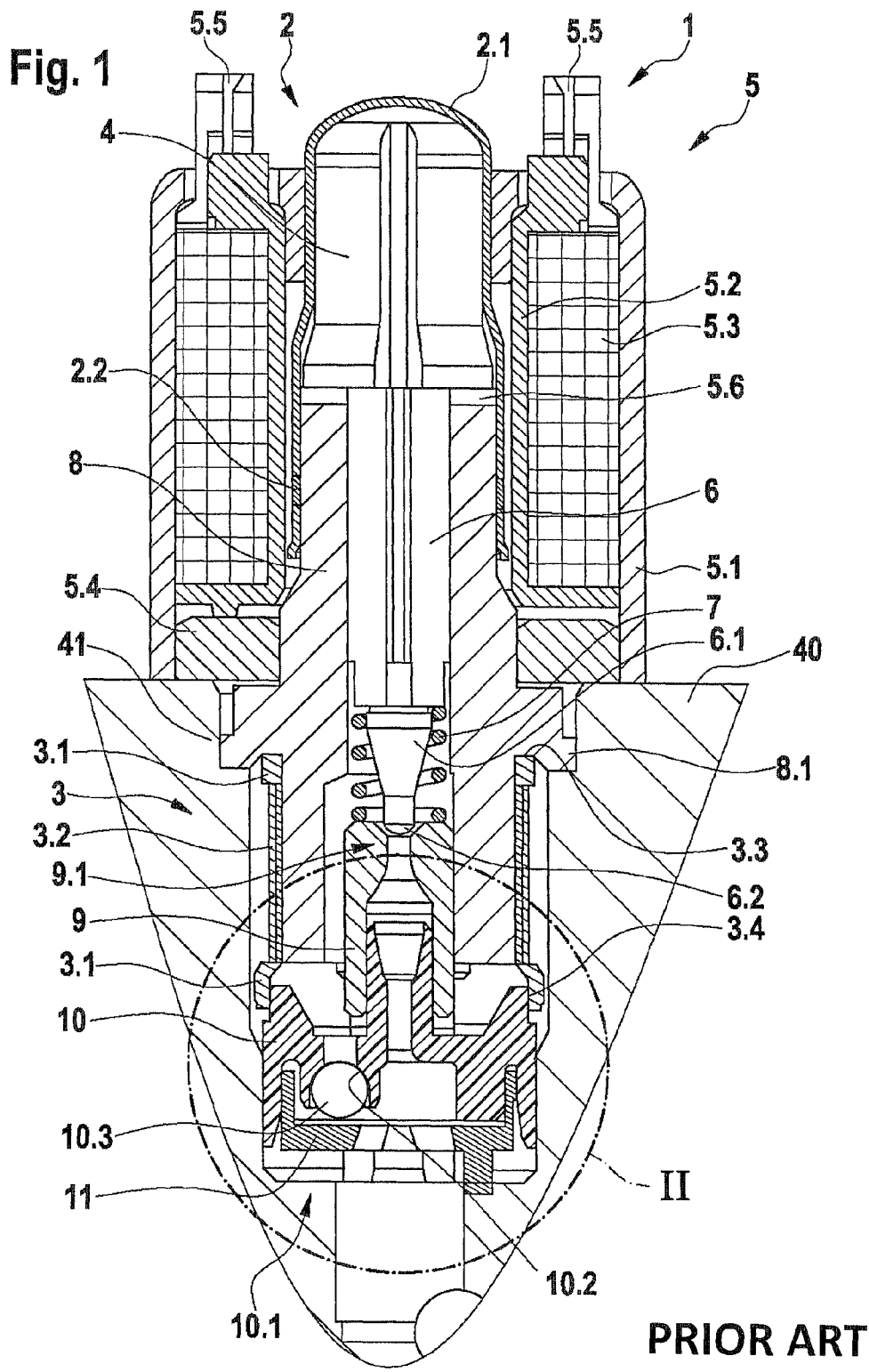
FIG. 1 shows a schematic sectional view of a conventional solenoid valve.
Figure 2:
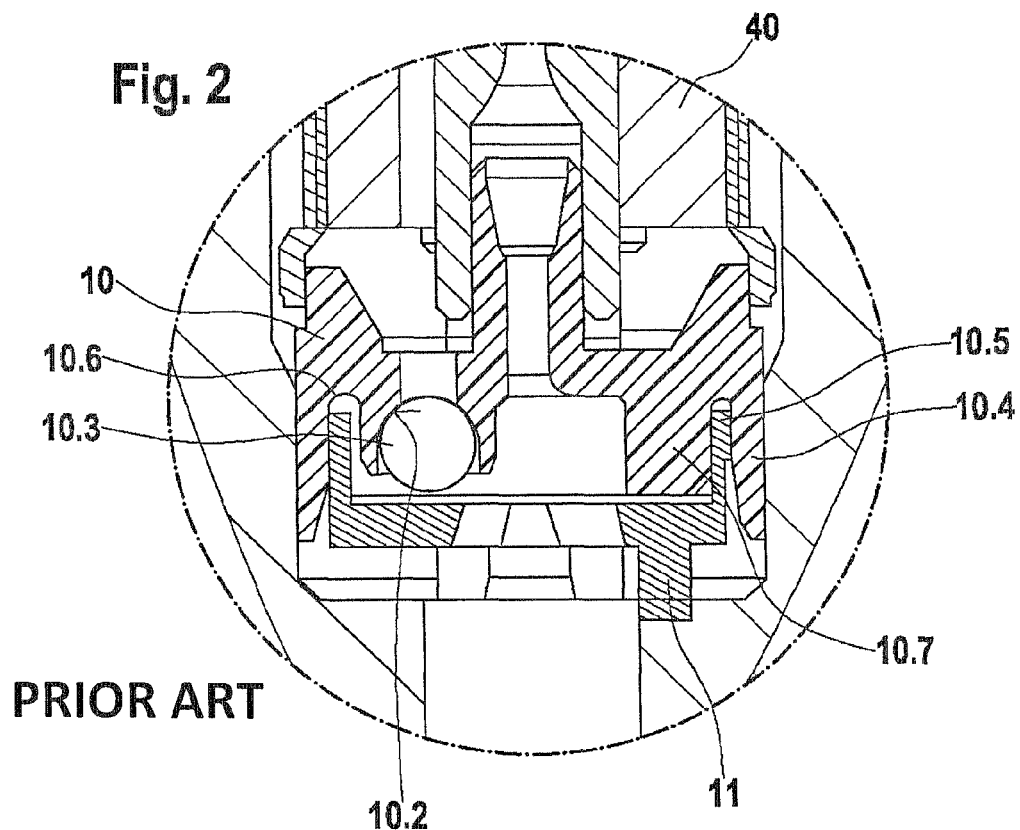
FIG. 2 shows a detailed sectional view of a portion of the conventional solenoid valve of FIG. 1.
Figure 3:
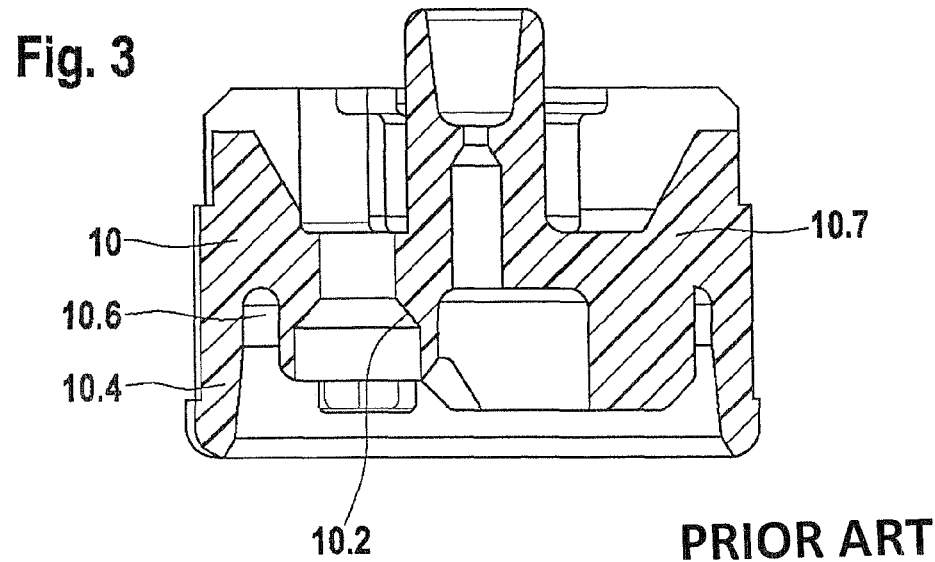
FIG. 3 shows a schematic sectional view of a lower valve part of the conventional solenoid valve of FIG. 1 or FIG. 2.
Figure 4:
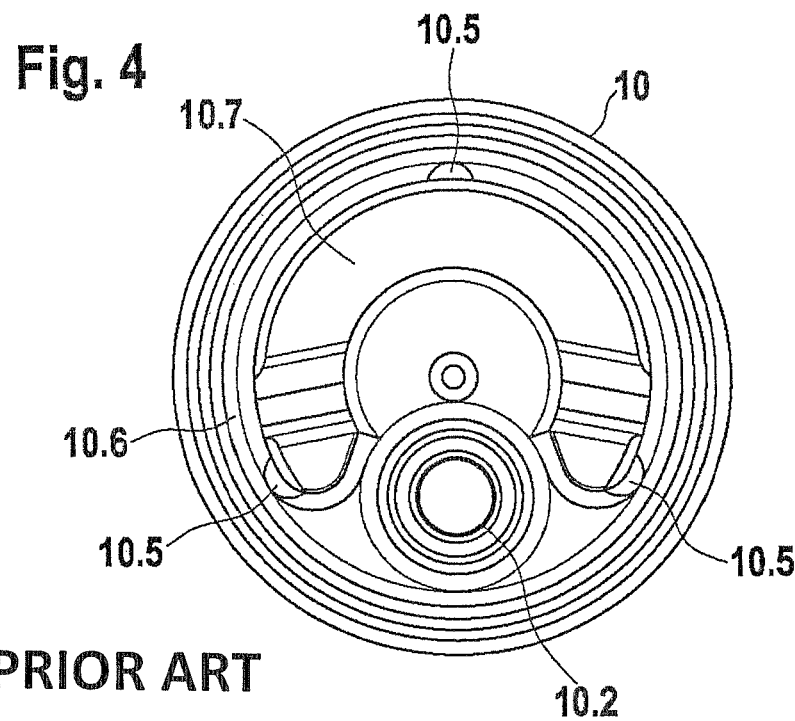
FIG. 4 shows a schematic illustration of a view of the lower valve part of FIG. 3 from below.
Figure 5:
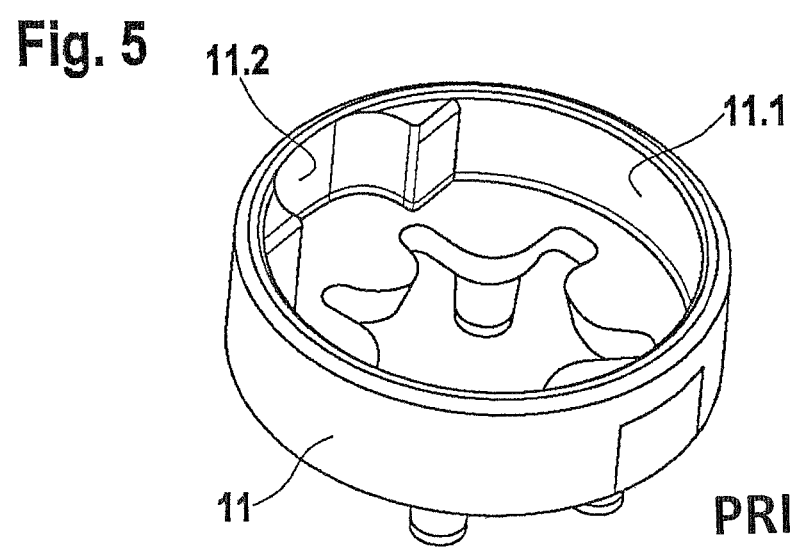
FIG. 5 shows a perspective view of a flat filter of the conventional solenoid valve of FIG. 1 or FIG. 2.

As can be seen from FIGS. 6 through 15, one exemplary embodiment of a valve cartridge 12 of the invention for a solenoid valve includes a capsule 12.1, a magnet armature 14 guided movably inside the capsule 12.1, a valve insert 18 that is inserted by a first end into the capsule 12.1, and a valve body 19 with a main valve seat 19.1. Inside the valve insert 18, a tappet 16 is guided longitudinally movably; it has a closing element 16.1 with a sealing element 16.2 that for performing a sealing function plunges sealingly into the main valve seat 19.1 of the valve body 19. The tappet 16 can be moved by the magnet armature 14 counter to the force of a restoring spring 17 inside the valve insert 18, and the magnet armature 14 is moved by a magnetic force that is generated by a magnet assembly, not shown. The magnet assembly may for instance be embodied analogously to the magnet assembly 5 of the conventional solenoid valve 1 of FIG. 1.

Figure 6:
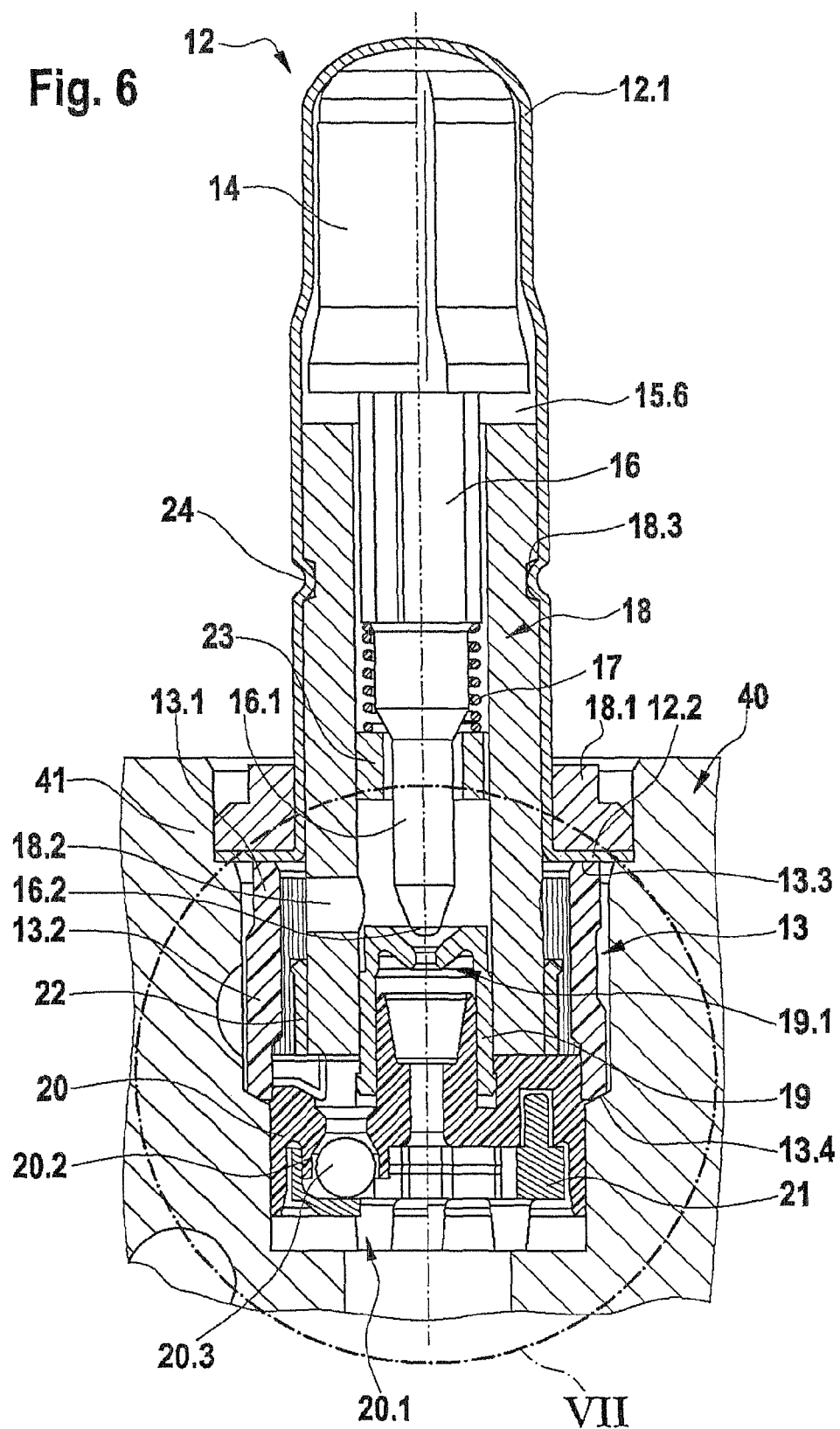
FIG. 6 shows a schematic sectional view of one exemplary embodiment of a valve cartridge of the invention for a solenoid valve.

As can also be seen from FIG. 6, the capsule 12.1, as a valve component that seals off from the atmosphere, is embodied as lengthened with a fluid block 40 in the direction of the calked region 41. The calking forces are therefore no longer absorbed by the valve insert 18 but rather by a calked bush 18.1. The calking geometry is optimized to such an extent that a calking process can be introduced that allows a reduced calking force; as a result, the deformation forces that act on the calked bush 18.1 and the capsule 12.1 can be reduced.

As can further be seen from FIG. 6, the valve insert 18 is embodied as a one-piece slit sleeve. The valve insert 18 embodied as a one-piece slit sleeve can be produced for instance by curling a sheet-metal strip. In the exemplary embodiment shown, an inner bore of the valve insert 18 has the shape of a complete circle or a shape very closely approximated to it, in which the tappet 16 is guided. To compensate for the volume that the tappet 16 displaces in its axial motion caused by the magnetic flux introduced by the magnet assembly, and for the sake of ventilation or filling, at least one axially extending volumetric compensation groove is machined into the tappet 16. Alternatively, however, the at least one volumetric compensation groove can also be machined into the inner bore of the valve insert 18. In an alternative embodiment, not shown, of the valve cartridge of the invention, at least one axially extending volumetric compensation groove can be machined into the valve insert 18, for instance, and can be predetermined by the shape of the inner bore of the valve insert.

Figure 7:
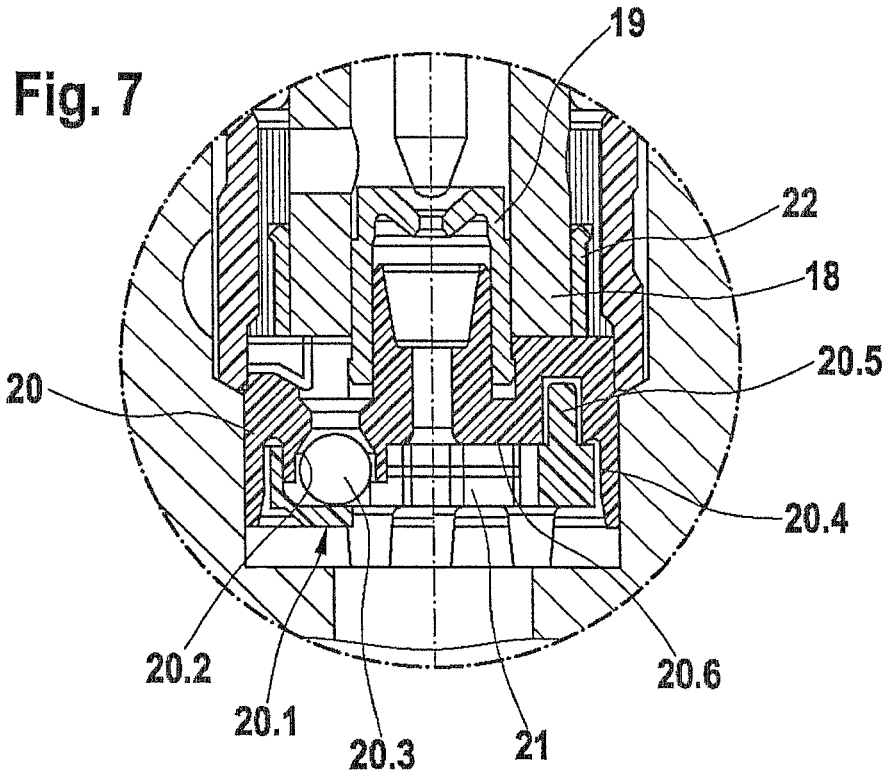
FIG. 7 shows a detailed sectional view of a portion of the valve cartridge of the invention of FIG. 6.
Figure 8:
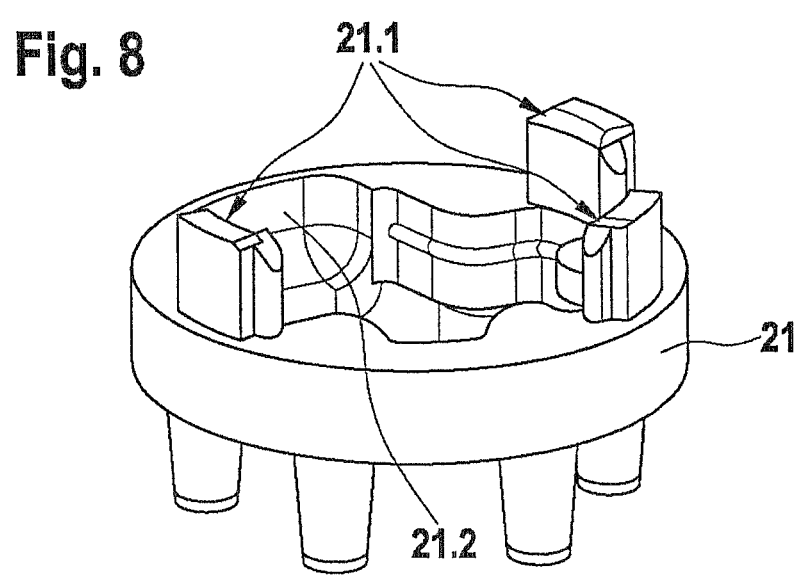
FIG. 8 shows a perspective view of a flat filter of the valve cartridge of the invention of FIG. 6 or FIG. 7.
Figure 9:
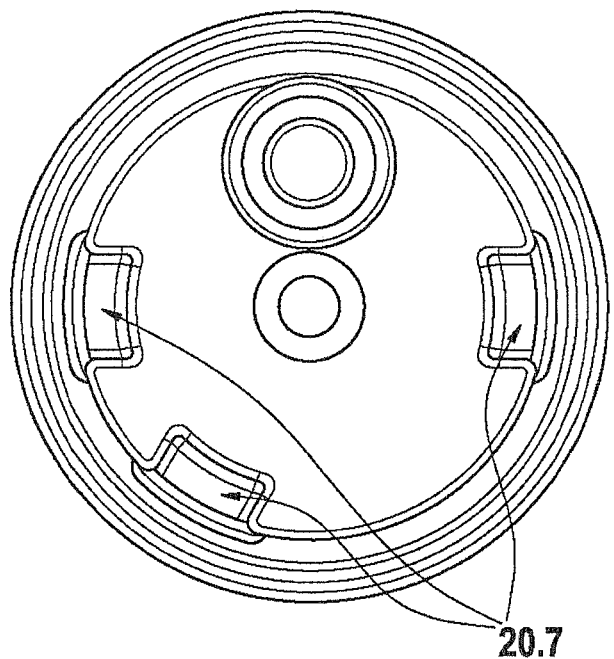
FIG. 9 shows a schematic illustration of a view of the lower valve part of FIG. 6 or FIG. 7 from below.
Figure 10:
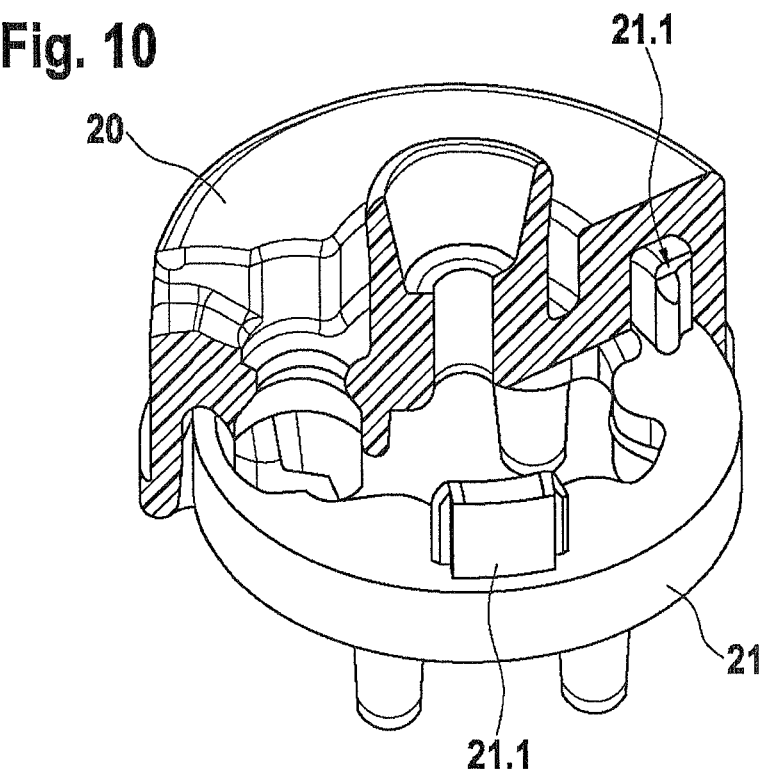
FIG. 10 shows a perspective view of the flat filter, connected to the lower valve part, the lower valve part being shown in section.
Figure 11:
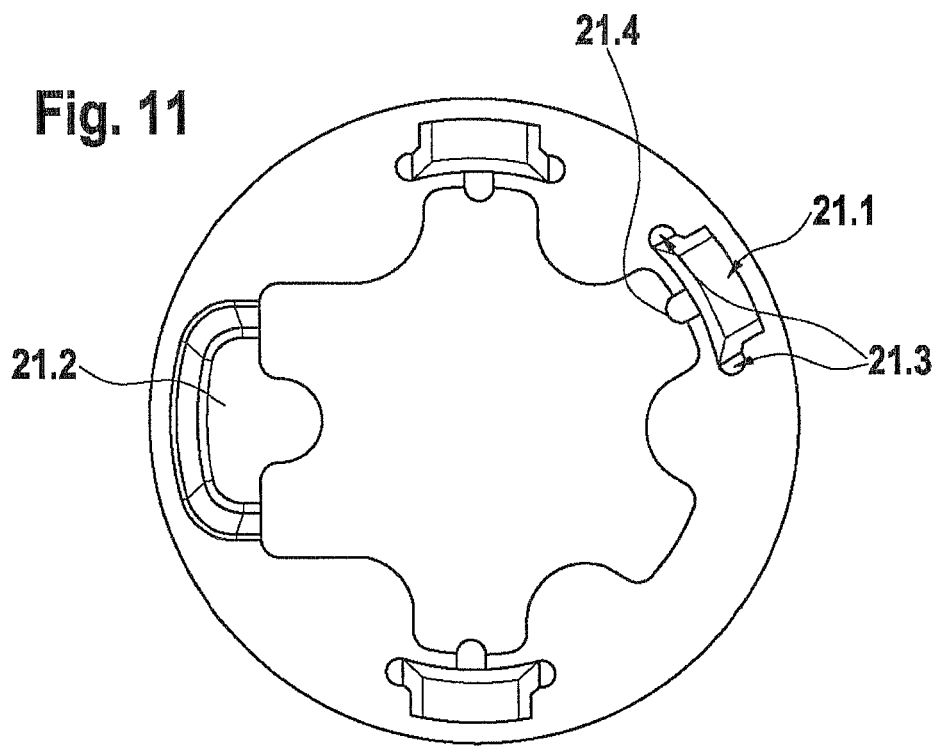
FIG. 11 shows a top view on the flat filter of FIG. 8.

As can also be seen from FIGS. 6 and 7, the valve body 19 is embodied as a hoodlike sleeve. The valve body 19 embodied as a sleeve is embodied as a deep-drawn part, for instance, and is pressed in such a way via a pressing region into a second end of the valve insert 18 embodied as a slit sleeve that the main valve seat 19.1 is disposed inside the valve insert 18. Via a decoupling region, the main valve seat 19.1 in the valve body 19 is decoupled from the pressing region, in order to prevent deformation of the main valve seat 19.1 caused by the operation of pressing the valve body 19 into the valve insert 18.

The hydraulic forces are absorbed by the valve insert 18 embodied as a slit sleeve. To prevent widening of the valve insert 18 from the pressing of the valve body 19, a reinforcing ring 22 is pressed onto the second end of the valve insert 18 in the exemplary embodiment shown. The pressed-on reinforcing ring 22 advantageously increases the design strength of the valve insert 18 when the valve body 19 is pressed in. In an alternative embodiment, not shown, of the valve cartridge 12 of the invention, the joints of the valve insert 18 embodied as a slit sleeve can be joined to one another on at least the second end of the valve insert 18, in order to increase the design strength of the valve insert 18 on pressing-in of the valve body 19. The joints of the valve insert 18 embodied as a slit sleeve can be joined to one another for instance by welding and/or adhesive bonding and/or toothing.

In the exemplary embodiment shown for the valve cartridge of the invention, a maximum stroke of the tappet 16 can be set by means of an axial displacement of the valve insert 18 inside the capsule 12.1. A minimum air gap 15.6 between the magnet armature 14 and the valve insert 18 can be set by axial displacement of the valve body 19 inside the valve insert 18 with the armature 14 inserted. The set air gap 15.6 can be fixed by means of a crimped connection 24 between the capsule 12.1 and the valve insert 18; for making the crimped connection 24, the valve insert 18 can be embodied with an encompassing groove 18.3. Thus by means of the crimped connection 24, it is ensured that the working air gap 15.6 will be preserved, and in addition, the hydraulically acting forces can be absorbed. The shape of the encompassing groove 18.3 can be geometrically altered and adapted in order to increase the axial retention forces of the crimped connection between the capsule 12.1 and the valve insert 18.

As can also be seen from FIG. 6, the restoring spring 17 for the tappet 16 is disposed outside the flow region, and the restoring spring 17 is braced on a spring support 23, which in the exemplary embodiment shown is embodied as a clamping sleeve introduced into the valve insert 18. Because the restoring spring 17 is shifted out of the space that has a flow through it, the wear of the tappet 16 can be reduced, and the flow rate between the main valve seat 19.1 and corresponding radial bores 18.2 made in the valve insert 18 can be increased.

As can further be seen from FIG. 6 or FIG. 7, a lower valve part 20 embodied as a plastic insert is placed axially against and braced on the valve insert 18, and via a dome, the lower valve part 20 is inserted in sealing fashion into an inner chamber in the valve body 19 and is sealed off from the surrounding fluid block 40 by the outer contour. Moreover, the lower valve part 20 shown has an eccentrically disposed check valve 20.1, with a check valve seat 20.2 and a check valve closing element 20.3, which is embodied as a ball and performs a directionally oriented flowthrough function. In addition, the lower valve part 20 receives a flat filter 21. A ring filter 13 with a support element 13.1 and a filter element 13.2 for filtering out dirt particles is attached sealingly to the valve cartridge 12. The ring filter 13 is embodied as a plastic injection-molded part, with an upper sealing point 13.3 and a lower sealing point 13.4. The upper sealing point 13.3 seals off a filtered fluid flow axially from a collar 12.2 integrally formed onto the capsule 12.1. The lower sealing point 13.4 seals off the filtered fluid flow axially from the fluid block 40, in which the valve cartridge 12 is calked.

As can be seen from FIGS. 8 through 15, in the retaining means of the invention for connecting the flat filter 21 to the lower valve part 20, the C-rib 10.8 used until now in the conventional lower valve part 10 and the encompassing annular rib 11.1 used for securing the conventional flat filter 11 are omitted. Because of the space-optimized redesign of the lower valve part 20 and flat filter 21, axial space in the lower region of the solenoid valve is thus saved. The thus greatly shortened encompassing annular rib in the lower valve part 20 is no longer used for the retention function of the flat filter 21. The novel, inventive clamping connection between the flat filter 21 and the lower valve part 20 is achieved in the exemplary embodiment shown via three retaining tabs 21.1, which plunge into three corresponding groove segments 20.7 in the lower valve part 20 and thus each make one partial clamping connection 20.5. In the process, clamping ribs 21.3 on the retaining tabs 21.1 of the flat filter 21 are radially over-pressed in the groove segments 20.7 of the lower valve part 20. The retaining tabs 20.1 can additionally be utilized for directional orientation of the flat filter 21 in the lower valve part 20. In addition to the retaining tabs 21.1, the flat filter 21 has a recess 21.2 for the check valve 20.1.

The essential advantage of the invention is that because of the space-optimized redesign of the lower valve part 20 and flat filter 21, a cost-saving embodiment of the valve cartridge 12 by sleeve technology is made possible. By embodying the valve cartridge 12 by sleeve technology, design-dictated greater axial tolerances in the lower region of the solenoid valve occur, which can also, among other ways, be structurally compensated for by the inventive retention concept between the flat filter 21 and the lower valve part 20. Moreover, by the embodiment according to the invention with the groove segments 20.7 that are made and the elimination of a C-rib, differences in wall thickness and accumulations of material in the lower valve part 20 can be reduced. This leads on the one hand to minimized shrinkage in the component during the production process, which is especially advantageous for the sealing function in the check valve 20.1, and on the other hand, strength-reducing flaws (bubbles) in the component can be minimized. Furthermore, an encompassing, contact-free sealing lip 20.4 can be made in the lower valve part 20, which has a spacing from the flat filter 21 that remains constant, and the flat filter furthermore rests on a contact face 20.6 of the lower valve part 20. As a result, an asymmetrical deformation of the sealing lip 20.4 and thus sacrifices in the sealing function relative to the fluid block 40 are avoided.

Figure 12:
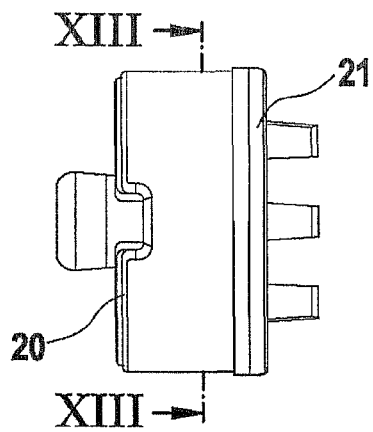
FIG. 12 shows a side view of the flat filter, connected to the lower valve part, in a first exemplary embodiment.
Figure 13:
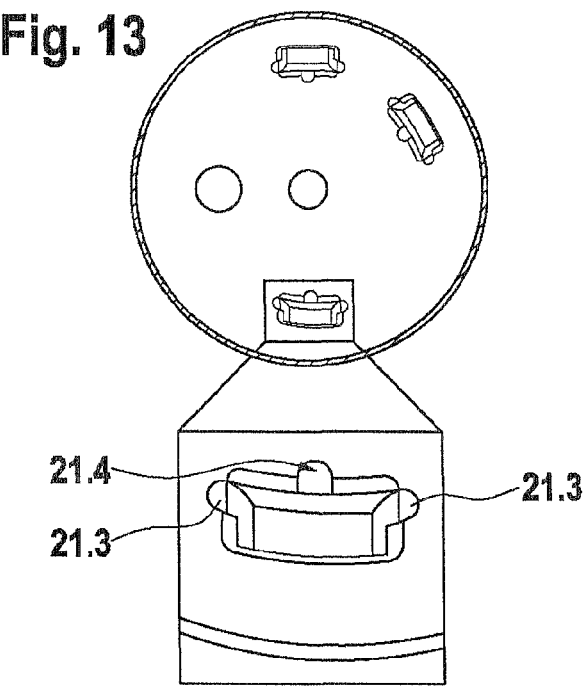
FIG. 13 shows a sectional view taken along the section line XIII in FIG. 12, with a detail.

In FIGS. 12 and 13, a first embodiment of the retaining tabs 21.1 of the flat filter 21 is shown. In this first embodiment shown, the retaining tabs 21.1 each have three clamping ribs, of which two clamping ribs 21.3 are on the outside, and one clamping rib 21.4 is on the inside.

Figure 14:
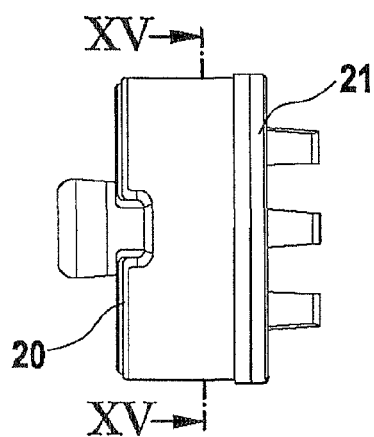
FIG. 14 shows a side view of the flat filter, connected to the lower valve part, in a second exemplary embodiment.
Figure 15:
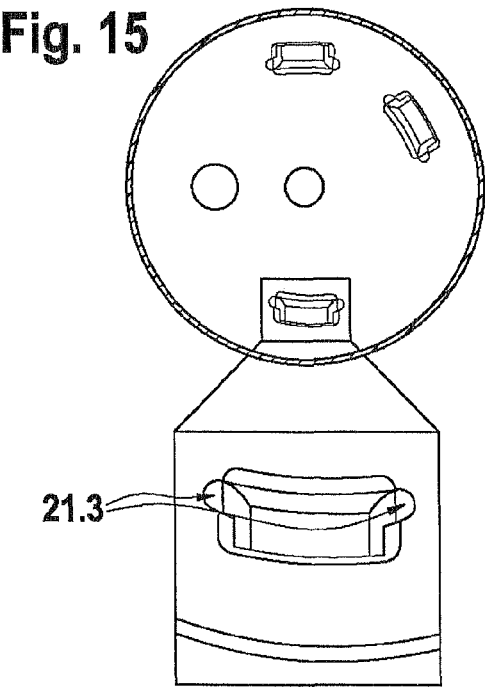
FIG. 15 shows a sectional view taken along the section line XV in FIG. 14, with a detail.

In FIGS. 14 and 15, a second embodiment of the retaining tabs 21.1 of the flat filter 21 is shown. In the second embodiment shown, the retaining tabs 21.1 each have only the two clamping ribs 21.3 that are located on the outside.

By means of the valve cartridge of the invention, an improved connection between the lower valve part and the flat filter is possible, and the axial space in the lower region of the solenoid valve can be reduced. Thus as a result of the reduced axial space, it is possible to embody the valve cartridge by the sleeve mode of construction, as a result of which a reduced structural height of the solenoid valve above the fluid block is advantageously obtained, which can have a favorable effect on the aggregate box volume. Moreover, inside the fluid block as well, a reduced structural height of the solenoid valve can be obtained, as a result of which the thickness of the fluid block can be reduced, so that further advantages can be attained with regard to weight and the aggregate box volume. Moreover, the retaining means of the invention avoids the introduction of force asymmetrically or at a single point in the vicinity of the sealing lip, which improves the sealing function relative to the fluid block. Moreover, because the wall thicknesses of the lower valve part remain essentially constant, flaws (bubble) in the plastic component made by injection molding can be avoided, and cycle times during the injection molding operation can be optimized.

The foregoing relates to the preferred exemplary embodiments of the invention, it being understood that other variants and embodiments thereof are possible within the spirit and scope of the invention, the latter being defined by the appended claims.

We claim:

1. A valve cartridge for a solenoid valve, comprising:
   a capsule;
   a valve insert that is inserted by a first end into the capsule and on its other end receives a valve body with a main valve seat;
   a lower valve part which is axially braced on the valve insert;
   a filter configured to filter dirt particles, the filter including (i) a body defining a check valve recess, (ii) a first end surface defining a first circumferential edge, (iii) a second end surface defining a second circumferential edge, and (iv) an exterior circumferential surface extending from the first circumferential edge to the second circumferential edge; and
   at least one retainer extending from the first end surface of the filter,
   wherein the lower valve part defines an internal space and includes a contact component facing the internal space, and
   wherein the filter is positioned in the internal space so that (i) the contact component contacts the first end surface of the filter, and (ii) no portion of the exterior circumferential surface contacts the lower valve part.

2. The valve cartridge as defined by claim 1, wherein the at least one retainer includes a retaining tab, and the internal space of the lower valve part defines a plurality of groove segments, wherein the retaining tab is configured to press-fit into a respective groove segment of the plurality of groove segments.

3. The valve cartridge as defined by claim 2, wherein at least one clamping rib is integrally formed onto the retaining tab and the clamping rib is configured to be over-pressed radially in the respective groove segment.

4. The valve cartridge as defined by claim 3 further comprising two clamping ribs integrally formed onto an outside of the retaining tab.

5. The valve cartridge as defined by claim 4, further comprising an additional clamping rib located on the inside of the retaining tab integrally formed on the retaining tab.

6. The valve cartridge as defined by claim 1, wherein:
   the lower valve part has a circumferential sealing lip,
   a circumferential spacing is defined between the circumferential sealing lip and the exterior circumferential surface of the filter, and
   the circumferential spacing remains constant when the filter is attached to the lower valve part with the at least one retainer.

7. The valve cartridge as defined by claim 5, wherein the lower valve part has a circumferential sealing lip, a circumferential spacing is defined between the circumferential sealing lip and the exterior circumferential surface of the filter, and the circumferential spacing remains constant from the filter when clamped.

8. The valve cartridge as defined by claim 1, wherein the lower valve part is embodied as a plastic injection-molded part, with a wall thickness that remains essentially constant.

9. The valve cartridge as defined by claim 7, wherein the lower valve part is embodied as a plastic injection-molded part, with a wall thickness that remains essentially constant.

10. The valve cartridge as defined by claim 1, wherein the valve insert is embodied as a one-piece slit sleeve, and the valve body is embodied as a hoodlike sleeve, and the valve body embodied as the hoodlike sleeve is pressed into a second end of the valve insert embodied as the slit sleeve, in such a manner that the main valve seat is disposed inside the valve insert.

11. The valve cartridge as defined by claim 9, wherein the valve insert is embodied as a one-piece slit sleeve, and the valve body is embodied as a hoodlike sleeve, and the valve body embodied as the hoodlike sleeve is pressed into a second end of the valve insert embodied as the slit sleeve, in such a manner that the main valve seat is disposed inside the valve insert.

12. The valve cartridge as defined by claim 1, wherein the capsule is embodied as a valve component that seals off from atmosphere and is calked to the fluid block via a calked bush in a calked region.

13. The valve cartridge as defined by claim 11, wherein the capsule is embodied as a valve component that seals off from atmosphere and is calked to the fluid block via a calked bush in a calked region.

14. A solenoid valve, having a magnet assembly and a valve cartridge, in which inside the valve cartridge, a magnet armature is guided movably, which is movable by a magnetic force generated by the magnet assembly and moves a tappet, guided inside the valve insert, which tappet has a closing element with a sealing element, and the sealing element, for performing a sealing function, plunges sealingly into the main valve seat of the valve body, wherein the valve cartridge is embodied in accordance with claim 1.

15. A solenoid valve, having a magnet assembly and a valve cartridge, in which inside the valve cartridge, a magnet armature is guided movably, which is movable by a magnetic force generated by the magnet assembly and moves a tappet, guided inside the valve insert, which tappet has a closing element with a sealing element, and the sealing element, for performing a sealing function, plunges sealingly into the main valve seat of the valve body, wherein the valve cartridge is embodied in accordance with claim 2.

16. A solenoid valve, having a magnet assembly and a valve cartridge, in which inside the valve cartridge, a magnet armature is guided movably, which is movable by a magnetic force generated by the magnet assembly and moves a tappet, guided inside the valve insert, which tappet has a closing element with a sealing element, and the sealing element, for performing a sealing function, plunges sealingly into the main valve seat of the valve body, wherein the valve cartridge is embodied in accordance with claim 3.

17. A solenoid valve, having a magnet assembly and a valve cartridge, in which inside the valve cartridge, a magnet armature is guided movably, which is movable by a magnetic force generated by the magnet assembly and moves a tappet, guided inside the valve insert, which tappet has a closing element with a sealing element, and the sealing element, for performing a sealing function, plunges sealingly into the main valve seat of the valve body, wherein the valve cartridge is embodied in accordance with claim 4.

18. A solenoid valve, having a magnet assembly and a valve cartridge, in which inside the valve cartridge, a magnet armature is guided movably, which is movable by a magnetic force generated by the magnet assembly and moves a tappet, guided inside the valve insert, which tappet has a closing element with a sealing element, and the sealing element, for performing a sealing function, plunges sealingly into the main valve seat of the valve body, wherein the valve cartridge is embodied in accordance with claim 5.

19. A solenoid valve, having a magnet assembly and a valve cartridge, in which inside the valve cartridge, a magnet armature is guided movably, which is movable by a magnetic force generated by the magnet assembly and moves a tappet, guided inside the valve insert, which tappet has a closing element with a sealing element, and the sealing element, for performing a sealing function, plunges sealingly into the main valve seat of the valve body, wherein the valve cartridge is embodied in accordance with claim 6.

20. A solenoid valve, having a magnet assembly and a valve cartridge, in which inside the valve cartridge, a magnet armature is guided movably, which is movable by a magnetic force generated by the magnet assembly and moves a tappet, guided inside the valve insert, which tappet has a closing element with a sealing element, and the sealing element, for performing a sealing function, plunges sealingly into the main valve seat of the valve body, wherein the valve cartridge is embodied in accordance with claim 7.

* * * * *